US007442020B2

(12) United States Patent
Mitsam

(10) Patent No.: US 7,442,020 B2
(45) Date of Patent: Oct. 28, 2008

(54) EMBOSSING STATION FOR AN EMBOSSING INSTALLATION

(75) Inventor: Reinwald Mitsam, Langenzenn (DE)

(73) Assignee: Leonhard Kurz GmbH & Co., Furth (DE)

( * ) Notice: Subject to any disclaimer, the term of this patent is extended or adjusted under 35 U.S.C. 154(b) by 9 days.

(21) Appl. No.: 10/578,964

(22) PCT Filed: Oct. 19, 2004

(86) PCT No.: PCT/DE2004/002329

§ 371 (c)(1),
(2), (4) Date: May 10, 2006

(87) PCT Pub. No.: WO2005/047019

PCT Pub. Date: May 26, 2005

(65) Prior Publication Data

US 2007/0148274 A1 Jun. 28, 2007

(30) Foreign Application Priority Data

Nov. 12, 2003 (DE) ................................ 103 52 700

(51) Int. Cl.
*B29C 59/04* (2006.01)

(52) U.S. Cl. ....................... 425/107; 425/371; 425/385; 425/471

(58) Field of Classification Search ............. 425/364 R, 425/371, 373, 385, 471, 107
See application file for complete search history.

(56) References Cited

U.S. PATENT DOCUMENTS 3,349,462 A 10/1967 Mott
3,917,774 A * 11/1975 Sagane et al. .............. 264/46.2
4,288,275 A 9/1981 Davis
5,458,477 A * 10/1995 Kemerer et al. ............. 425/371
5,700,495 A * 12/1997 Kemerer et al. ............. 425/190
6,343,924 B1 * 2/2002 Klepsch ...................... 425/223

FOREIGN PATENT DOCUMENTS

DE 44 16 421 A1 11/1995
DE 100 37 643 A1 2/2002
DE 202 05 662 U1 8/2002
DE 101 59 662 A1 6/2003
EP 0 521 414 A1 1/1993
SU 93477 A 1/1952
WO PCT/DE03/01042 * 3/2003

* cited by examiner

*Primary Examiner*—Philip C Tucker
*Assistant Examiner*—Seyed Masoud Malekzadeh
(74) *Attorney, Agent, or Firm*—Hoffmann & Baron, LLP

(57) ABSTRACT

An embossing station for an embossing apparatus is provided for transferring a transfer layer of an embossing film on to an element to be embossed upon, in particular a flat element to be embossed upon which is stable in respect of shape. The embossing station has two support rollers which are spaced from each other and which are in mutually axis-parallel relationship and at least one deflection roller which is spaced from the support rollers and which is in axis-parallel relationship with the support rollers. An embossing belt is deflected around the support rollers and the at least one deflection roller. Provided between the two support rollers is a support body which supports the embossing belt and which has a sliding surface which is in the tangential plane connecting the two support rollers together.

9 Claims, 3 Drawing Sheets

EMBOSSING STATION FOR AN EMBOSSING INSTALLATION

CROSS-REFERENCE TO RELATED APPLICATIONS

This application is a National Phase application of International Application No. PCT/DE 2004/002329 filed Oct. 19, 2004, which claims priority based on German Patent Application No. 103 52 700.1, filed Nov. 12, 2003 , which are both incorporated herein by reference.

BACKGROUND OF THE INVENTION

The invention concerns an embossing station for an embossing apparatus which is provided for transferring a transfer layer of an embossing film on to an element to be embossed upon, in particular a flat element to be embossed upon which is stable in respect of shape, wherein the embossing station has two support rollers which are spaced from each other and which are in mutually axis-parallel relationship and at least one deflection roller spaced from the support rollers and in axis-parallel relationship with the support rollers, around which an embossing belt is deflected, wherein an embossing section of the embossing belt is determined by the support rollers.

An embossing station of that kind is known from DE 202 05 662 U1. In order to positively influence the quality of the join of the transfer layer of the embossing film to the element to be embossed upon, in particular the flat element to be embossed upon which is stable in respect of shape, it is proposed therein that at least one stabilisation roller which bears against the embossing belt is provided between the two support rollers which define the embossing section of the embossing belt. Those stabilisation rollers are of a smaller diameter than the support rollers in order to be able to provide a suitable number of stabilisation rollers between the two support rollers and in that way to increase the number of line contacts. As a consequence of the smaller diameter the rotary speed of the stabilisation rollers is correspondingly increased. That increased rotary speed of the stabilisation rollers is accompanied by a reduction in the service life of the bearings of the stabilisation rollers.

DE 101 59 662 A1 discloses a deflection roller for an embossing machine, with which an increase in output, that is to say an increase in the machine speed of the embossing machine, in other words an increase in the rotary speed of the roller, is possible by securing to a bar which is fixed with respect to the machine, a porous air-permeable bar sleeve on which a roller sleeve is mounted, wherein the roller bar has a compressed air passage for supplying the bar sleeve with compressed air which is provided to form an air cushion between the bar sleeve and the roller sleeve. That air cushion affords a substantial reduction in the frictional losses of that known deflection roller.

An apparatus for transferring a decoration from an embossing film on to a web of material is known for example from EP 0 521 414 B1.

A heatable and coolable roller with an almost friction-free mounting arrangement is described in DE 44 16 421 A1. That known roller serves for transporting material in web form and for providing for temperature control thereof, wherein a fluid is used for supporting a roller casing which rotates on a stationary cylindrical core, the fluid flowing predominantly in the peripheral direction between the roller casing and the roller core. That fluid can be used at the same time for temperature control of the roller casing.

An air-supported roller is also known for example from U.S. Pat. No. 3,349,462 A.

As, in an embossing station of the kind set forth in the opening part of this specification, the quality of the join of the transfer layer of the embossing film to the element to be embossed upon, in particular the flat element which is stable in respect of shape, as well as the embossing speed are dependent to a high degree on the number of line contacts along the embossing section between the embossing belt and the flat element to be embossed upon, the requirement involved is that of providing for an improvement in the quality and an increase in the embossing speed by increasing the number of line contacts.

SUMMARY OF THE INVENTION

The object of the invention is to provide an embossing station of the kind set forth in the opening part of this specification which, being of a comparative simple structure, permits an increase in the embossing speed which is accompanied by an improvement in embossing quality.

According to the invention that object is attained by the features of claim 1, that is to say in that provided between the two support rollers is a support body which supports the embossing belt and which has a sliding surface which is in the tangential plane connecting the two support rollers together. The sliding surface of the support body therefore forms not just a number of line contacts but a surface contact by which the quality of the embossing action is improved and at the same time the embossing speed can be increased.

The sliding surface of the support body provided between the two support rollers extends from the one support roller to the other and thus so-to-speak along the entire embossing section of the embossing belt so that the support body produces a surface contact instead of line contacts between the embossing belt, the embossing film and the element to be embossed upon, in particular the flat element to be embossed upon which is stable in respect of shape.

As the embossing belt is for example a silicone belt having a mechanical reinforcement so that there is a level of friction which is not to be disregarded between the embossing belt and the sliding surface of the support body, it is desirable if the embossing belt has a low-friction layer at its inside which is towards the two support rollers and the sliding surface of the support body. That low-friction layer can be a low-friction coating on the embossing belt. An embossing belt which is designed in that way is however relatively cost-intensive so that, from the point of view of cost reduction, it may be desirable if in accordance with the invention a conventional embossing belt is used and if a sliding belt passes around the two support rollers, the embossing belt being provided at the outside of the sliding belt, which is remote from the support rollers. That sliding belt passes around the two support rollers and encloses the support body. The sliding belt bears against the sliding surface of the support body. The sliding belt is of a relatively low coefficient of friction in relation to the support body. For that purpose it is advantageous if the sliding belt has on a carrier a low-friction coating which is towards the two support rollers and the sliding surface of the support body.

The sliding belt can be tensioned around the two support rollers by means of a tensioning device. An advantage of the above-specified configuration is that, upon a change in the embossing belt, that is to say upon replacement for example of a worn embossing belt by an unused new embossing belt, the sliding belt can remain in the embossing station, that is to say on the two support rollers.

If however for example abrasive dust is present in the environment of the embossing station according to the invention, that leads to a relatively severe amount of wear not only of the embossing belt but possibly also severe wear of the sliding belt and in the extreme case also the support body. In order to prevent such unwanted premature wear it is preferable if in the embossing station according to the invention the support body has a gas-permeable porous flat element by which the sliding surface of the support body is formed. Independent patent protection is requested for an embossing station of such a design configuration. The stated gas-permeable porous flat element can comprise an open-pore sintered metal or an open-pore sintered ceramic, wherein the sliding surface is suitably surface-treated to achieve a smooth sliding surface.

In an embossing station of the last-mentioned kind it is preferable if the gas-permeable porous element closes a cavity which is provided in the support body and into which a compressed gas inlet opens. The compressed gas can be for example compressed air.

It is desirable if the gas-permeable porous flat element has a main surface which faces towards the embossing belt and two laterally mutually oppositely disposed side surfaces which are associated with the two mutually remote longitudinal edges of the embossing belt, wherein in operation of the embossing station a gas cushion is formed between the embossing belt and the porous surface element. That air cushion between the embossing belt and the porous flat element of the support body causes a negligibly low level of friction between the support body and the embossing belt, while in addition an accumulation of abrasive dust on the embossing belt and the support body is advantageously prevented. The porous flat element of the support body permits such high pressures in relation to surface area, between the embossing belt and the element to be embossed upon, that the embossing operation is not adversely affected. In addition, a suitable selection of the material for the porous flat element, that is to say suitable dimensioning of the porosity of the flat element, means that the consumption of compressed gas can be so low that cooling of the embossing belt during the embossing operation by the compressed gas is negligibly slight. From the point of view of a possible undesirable cooling effect, it is appropriate if the support body and/or the compressed gas inlet are/is provided with a heating device. With a heating device of that kind the support body and/or the compressed gas which acts on the support body can be suitably warmed in order to compensate for a corresponding energy loss. The heating device can advantageously also be used to support the step of heating up the embossing station when it is brought into operation.

BRIEF DESCRIPTION OF THE DRAWINGS

Further details, features and advantages will be apparent from the description hereinafter of embodiments by way of example of the embossing station according to the invention, which are diagrammatically illustrated in the drawing in which.

DETAILED DESCRIPTION OF THE INVENTION

Figure 1:
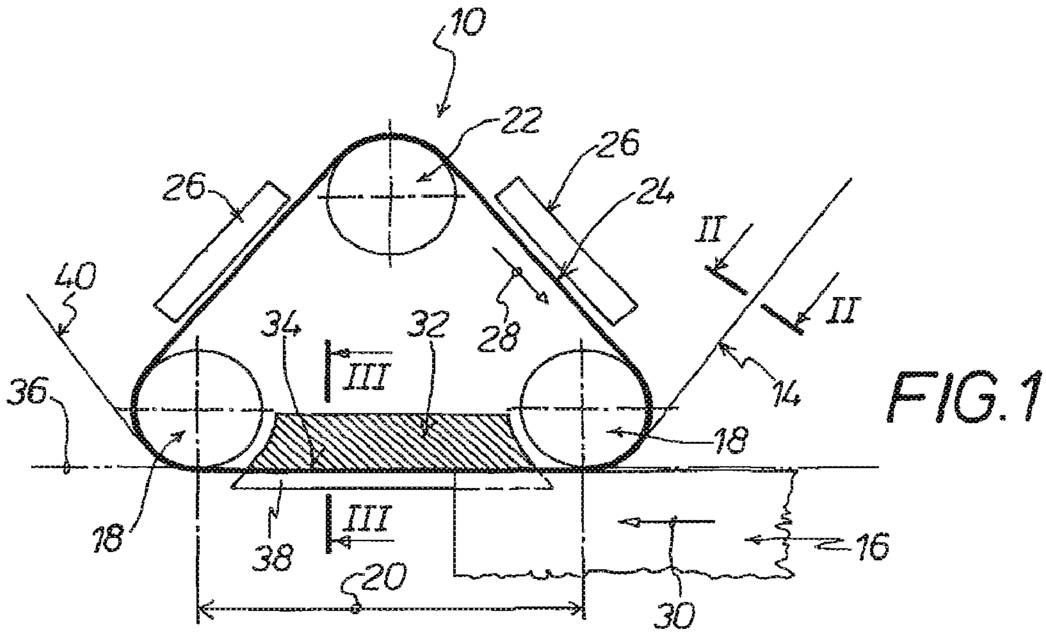
FIG. 1 is a diagrammatic side view of a first embodiment of the embossing station.

FIG. 1 shows a configuration of the embossing station 10 for an embossing apparatus, which is provided for the transfer of a transfer layer 12 (see FIG. 2) of an embossing film 14 on to an element to be embossed upon, in particular a flat element 16 to be embossed upon, which is stable in respect of shape. The flat element 16 which is stable in respect of shape is for example panels for articles of furniture such as table tops or the like, floor, wall or ceiling boards or panels or plastic profile members and the like.

The embossing station 10 has two support rollers 18 which are spaced from each other and which are in mutually axis-parallel relationship and by which an embossing section 20 of the embossing station 10 is determined. A deflection roller 22 is provided at a spacing from the two support rollers 18 and in axis-parallel relationship therewith. An endless embossing belt 24 is deflected around the two support rollers 18 and around the deflection roller 22.

A heating device 26 diagrammatically indicated by a block is provided for heating the embossing belt 24. The embossing belt 24 runs for example in the direction of the arrow 28 around the support rollers 18 and around the deflection roller 22. The flat element 16 to be embossed upon is advanced at the same speed along the embossing section 20 at the embossing station 10. That is indicated by the arrow 30. A support body 32 is provided between the two support rollers 18. The support body 32 has a sliding surface 34 provided in the tangential plane 36 connecting the two support rollers 18 together.

Figure 3:
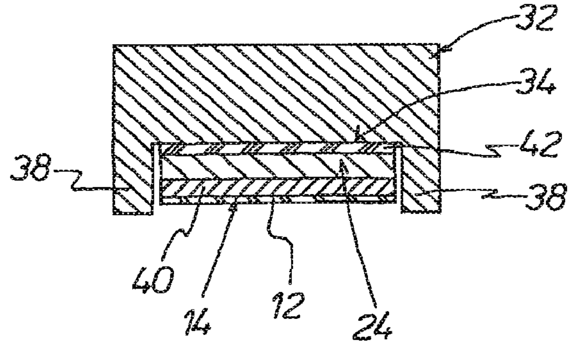
FIG. 3 is a view in section taken along section line III-III in FIG. 1 through the support body, the embossing belt and the embossing film.

As can be seen from FIG. 3 the sliding surface 34 of the support body 32 is provided at its two mutually opposite edges with side limbs 38 which serve for laterally guiding the circulating embossing belt 24 and the embossing film 14 along the embossing section 20.

Figure 2:
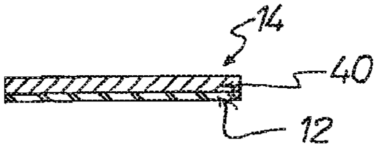
FIG. 2 is a view in section taken along section line II-II in FIG. 1 through the embossing film.

Referring to FIG. 1 a carrier layer 40 of the embossing film 14 is indicated on the left-hand side, that is to say going away from the left-hand support roller 18 (see also FIG. 2). At the entry to the embossing station 10, that is to say at the entry into the embossing section 20 of the embossing station 10, the embossing film 14 is formed by the carrier layer 40 and the transfer layer 12 which is provided releasably on the carrier layer 40. An embossing film 14 of that kind is known per se so that there is no need to enter into a more detailed discussion thereof at this point.

At the embossing section 20 the transfer layer 12 of the embossing film 14 is transferred from the carrier layer 40 to the flat element 16.

In order to reduce the friction between the support body 32 along the sliding surface 34 and the embossing belt 24 which circulates around the support rollers 18 and the deflection roller 22, the embossing belt 24, at its inside which is towards the two support rollers 18 and the support body 32, has a low-friction layer 42 (see FIG. 3) which is formed by a coating of a suitable material.

Figure 4:
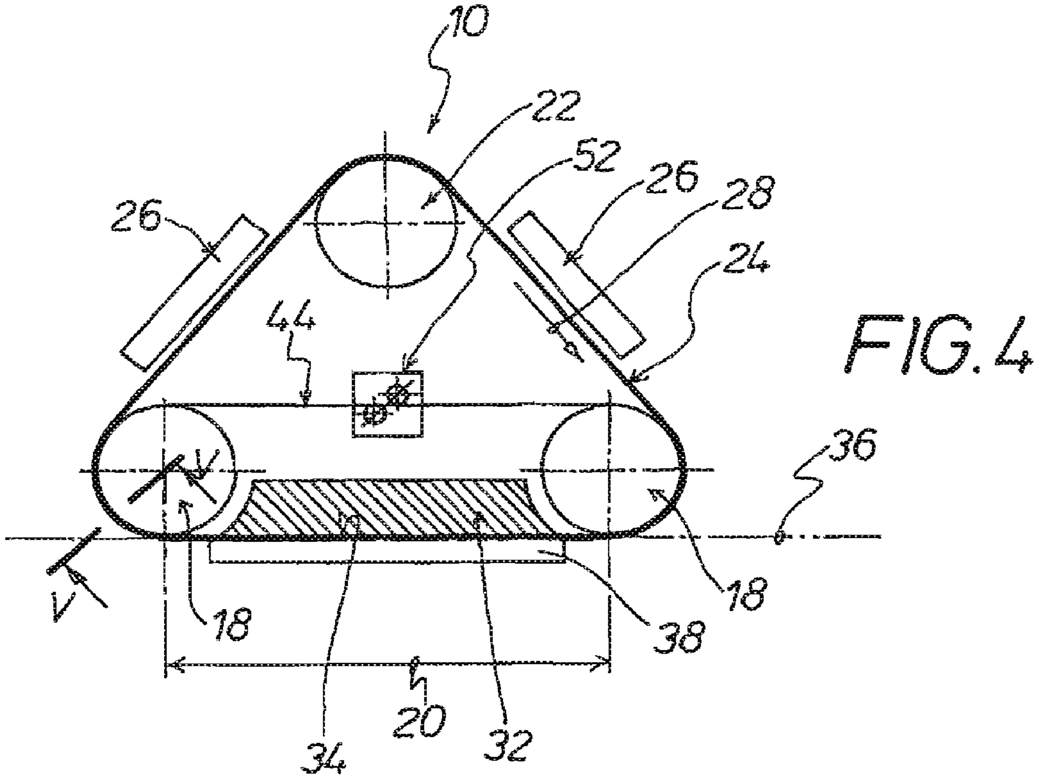
FIG. 4 shows a side view similar to FIG. 1 of a second embodiment of the embossing station.
Figure 5:
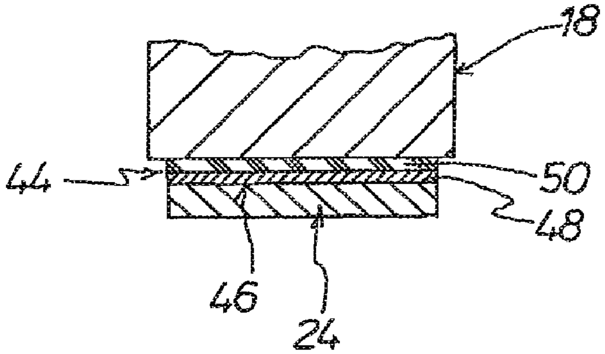
FIG. 5 is a view in section taken along section line V-V in FIG. 4 through the support roller, the sliding belt and the embossing belt.

FIG. 4 is a view similar to FIG. 1 showing the principle involved in a further configuration of the embossing station 10, wherein a sliding belt 44 circulates around the two support rollers 18. The embossing belt 24 is provided at the outside 46 of the sliding belt 44, that is remote from the support rollers 18, as is also clearly illustrated in FIG. 5. The embossing belt 24 circulates around the two support rollers 18 and the deflection roller 22. The sliding belt 44 has a carrier 48 and a low-friction coating 50 on the carrier 48. The low-friction coating 50 is towards the two support rollers 18 and the sliding surface 34 of the support body 32 provided between the two support rollers 18. The sliding belt 44 can be definably tensioned around the two support rollers 18 by means of a tensioning device 52.

The same details are denoted in FIGS. 4 and 5 by the same references as in FIGS. 1 through 3 so that there is no need for all those features to be described in detail once again in relation to FIGS. 4 and 5.

Figure 6:
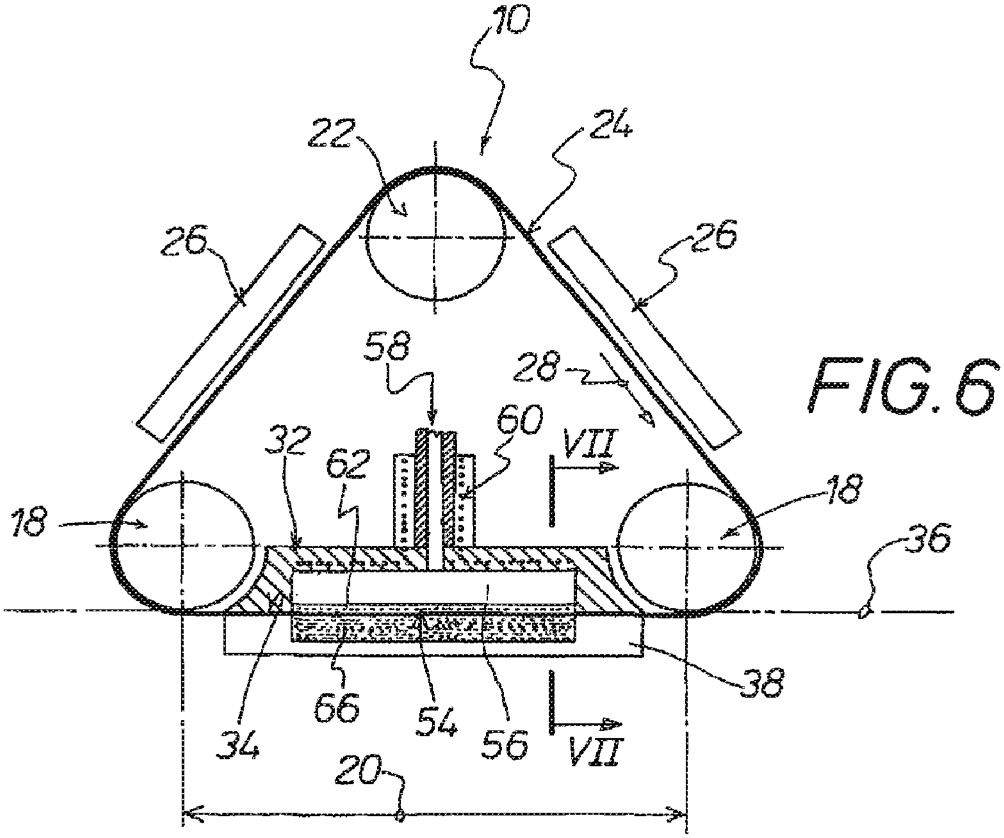
FIG. 6 shows a side view similar to FIGS. 1 and 4 of a third embodiment of the embossing station.
Figure 7:
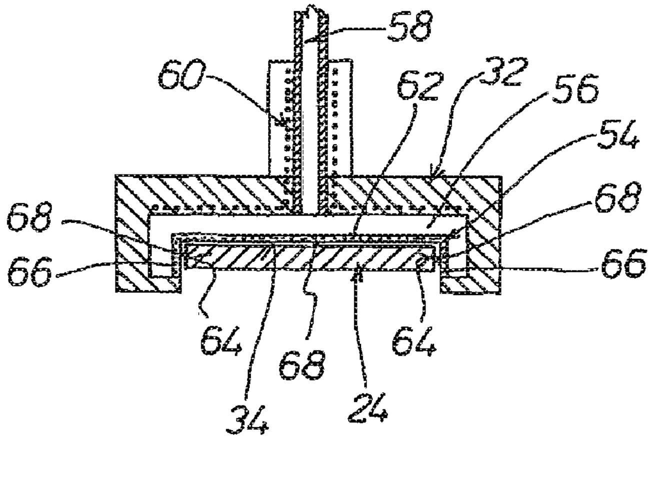
FIG. 7 is a view in section taken along section line VII-VII in FIG. 6 through the support body and the embossing belt.

FIG. 6 is a diagrammatic side view similar to FIGS. 1 and 4 showing a third preferred embodiment of the embossing station 10, wherein the support body 32 provided between the two support rollers 18 has a gas-permeable porous flat element 54 forming the sliding surface 34 of the support body 32, as in particular also FIG. 7 clearly shows. The gas-permeable, that is to say open-pore flat element 54 comprising a sintered material closes off outwardly a cavity 56 formed in the support body 32. A compressed gas inlet 58 opens into the cavity 56. The compressed gas inlet 58 and/or the support body 32 are provided with a heating device 60.

As in particular FIG. 7 clearly shows the gas-permeable porous flat element 54 has a main surface 62 towards the embossing belt 24 and two laterally mutually opposite side surfaces 66 which are associated with the two mutually remote longitudinal edges 64 of the embossing belt 24 so that in operation of the embossing station 10, that is to say when the cavity 56 of the support body 32 is acted upon with compressed gas, an air cushion 68 is formed between the embossing belt 24 and the porous flat element 54, wherein the embossing belt 24 is slightly spaced at all sides from the support body 32 by the air cushion 68 so that the friction between the embossing belt 24 and the support body 32 is negligibly slight.

The same details are denoted in FIGS. 6 and 7 by the same references as in FIGS. 1 through 4 so that there is no need for all those features to be described in detail once again in relation to FIGS. 6 and 7.

What is claimed is:

1. An embossing station for an embossing apparatus which is provided for transferring a transfer layer of an embossing film on to an element to be embossed upon, in particular a flat element to be embossed upon which is stable in respect of shape, wherein the embossing station has two support rollers which are spaced from each other and which are in mutually axis-parallel relationship and at least one deflection roller spaced from the support rollers and in axis-parallel relationship with the support rollers, around which an embossing belt is deflected, wherein an embossing section of the embossing belt is determined by the support rollers, wherein provided between the two support rollers is a support body which supports the embossing belt and which has a sliding surface which is in the tangential plane connecting the two support rollers together.

2. An embossing station as set forth in claim 1, wherein the embossing belt has a low-friction layer at its inside which is towards the two support rollers and the support body.

3. An embossing station as set forth in claim 1, wherein a sliding belt passes around the two support rollers, the embossing belt being provided at the outside of the sliding belt, which is remote from the support rollers.

4. An embossing station as set forth in claim 3, wherein the sliding belt has on a carrier a low-friction coating which is towards the two support rollers and the sliding surface of the support body.

5. An embossing station as set forth in claim 3, wherein the sliding belt can be tensioned around the two support rollers by means of a tensioning device.

6. An embossing station as set forth in claim 1, wherein the support body has a gas-permeable porous flat element by which the sliding surface is formed.

7. An embossing station as set forth in claim 6, wherein the gas-permeable porous element closes a cavity which is provided in the support body and into which a compressed gas inlet opens.

8. An embossing station as set forth in claim 6, wherein the gas-permeable porous flat element has a main surface which faces towards the embossing belt and two laterally mutually oppositely disposed side surfaces which are associated with the two mutually remote longitudinal edges of the embossing belt, wherein in operation of the embossing station a gas cushion is formed between the embossing belt and the gas-permeable porous surface element of the support body.

9. An embossing station as set forth in claim 7, wherein the support body and/or the compressed gas inlet are/is provided with a heating device.

* * * * *